United States Patent [19]

Lifshitz et al.

[11] Patent Number: 4,516,923
[45] Date of Patent: May 14, 1985

[54] FOOD PRESS FORMS

[76] Inventors: Igor Lifshitz; Ifim Lifshitz, both of 1635 N. Martel Ave., #316, Los Angeles, Calif. 90046

[21] Appl. No.: 594,740

[22] Filed: Mar. 29, 1984

[51] Int. Cl.³ .......................... B29C 1/00; A21C 5/00; A21C 9/05; A21C 11/10
[52] U.S. Cl. .................................. 425/289; 99/450.6; 249/66 R; 249/12; 249/129; 249/170; 425/306; 425/383; 425/442
[58] Field of Search ............... 249/119, 129, 120, 132, 249/134, 170, 66 R; 425/289, 292, 298, 306, 324.1, 510, 512, 344, 436 R, 438, 440, 442; 99/353, 450.6; 156/245

[56] References Cited

U.S. PATENT DOCUMENTS

| 1,785,797 | 12/1930 | Watson | 425/436 |
| 3,782,271 | 1/1974 | Tobey et al. | 425/398 |
| 4,362,497 | 12/1982 | Lifshitz | 425/292 |
| 4,382,768 | 5/1983 | Lifshitz et al. | 425/292 |

Primary Examiner—Willard E. Hoag
Attorney, Agent, or Firm—Erik M. Arnhem

[57] ABSTRACT

Food products are processed prior to consumption in a press form, comprising two hinged together trays, rows of multiple separate food product molding apertures arranged staggered relative to one another in the trays, feet members mounted for support of and underneath the trays, respectively arranged in alignment with and adjacent to a molding aperture, said feet members being utilized to intercept and eject food products from the molding apertures, when the trays are swung inwardly from an aligned into a superposed position.

4 Claims, 8 Drawing Figures

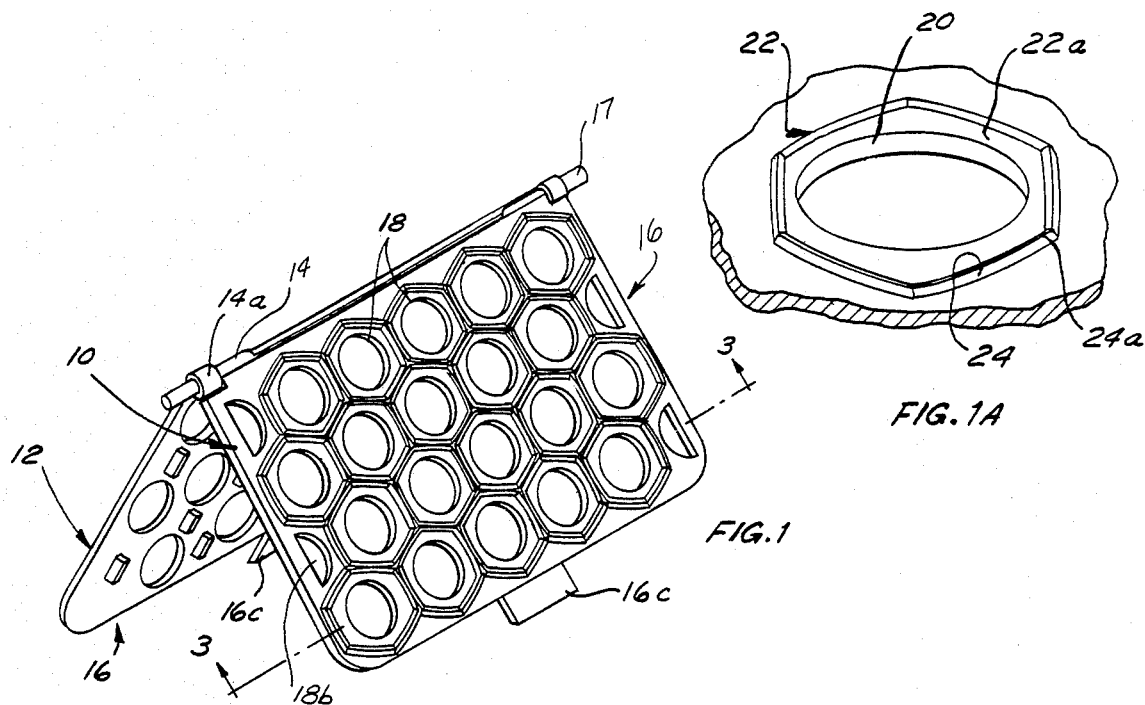
FIG. 1
FIG. 1A
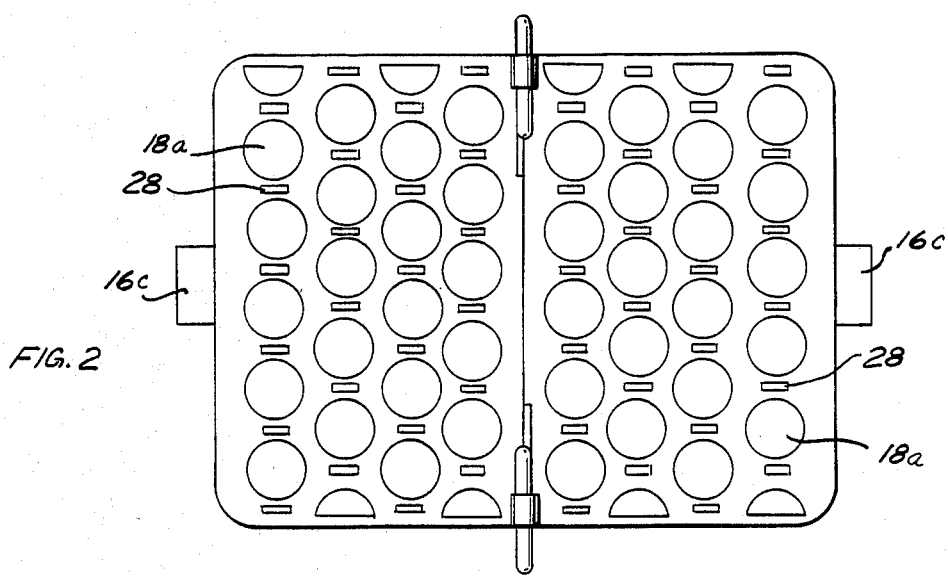
FIG. 2
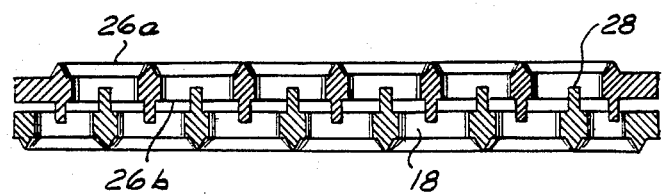
FIG. 3

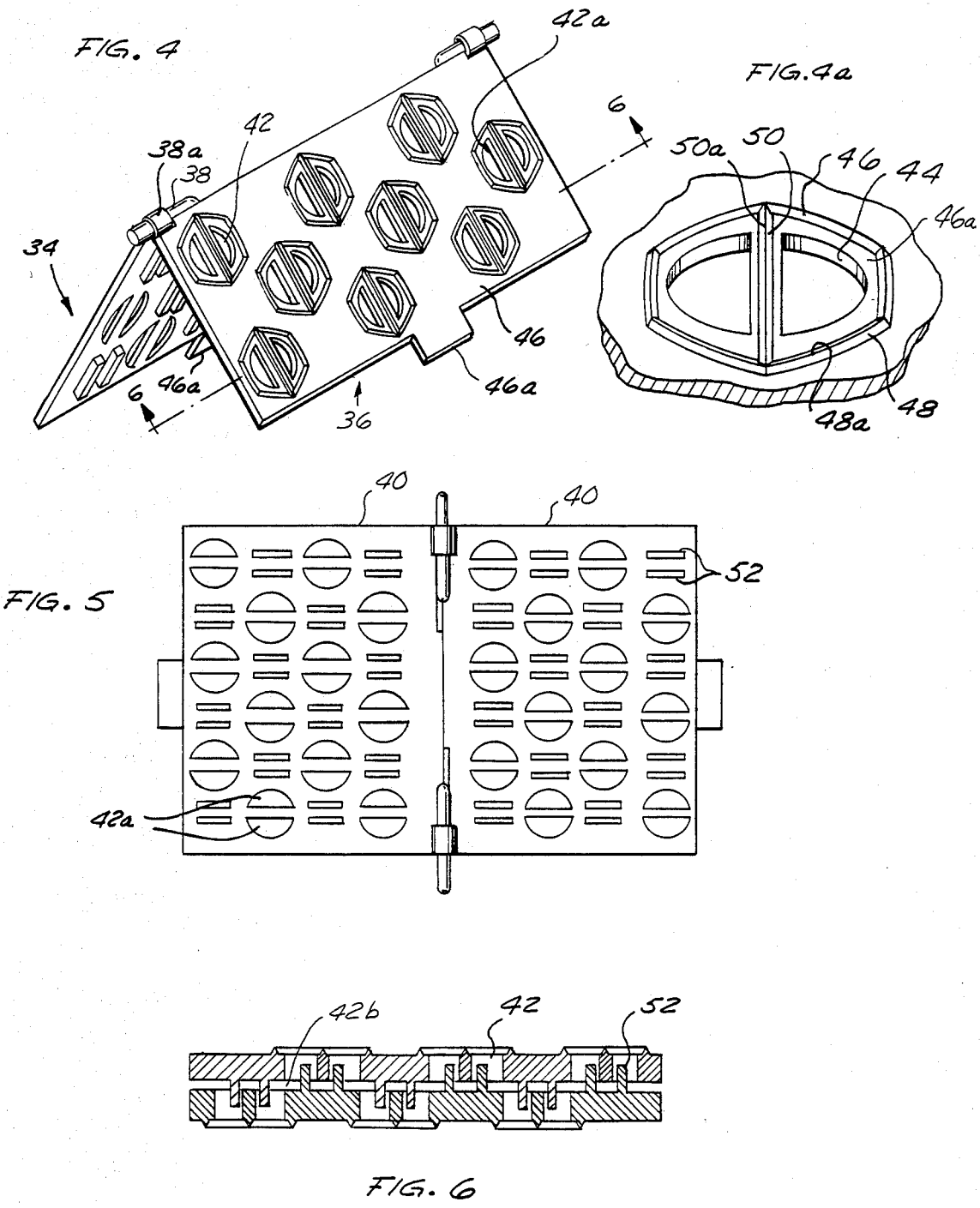

FOOD PRESS FORMS

BACKGROUND OF THE INVENTION

1. Field of the Invention

The present invention relates to a manual device for simply and rapidly producing food products consisting of fillings, such as pastries, meat and the like, sandwiched between two layers of dough. The device, according to the invention, is particularly suitable for small scale production of such food products, permitting the user of the device to simultaneously cut and make e.g. a substantial number of ready-to-serve ravioli, creplich, empanada, wonton pieces, etc. All these products, characteristically consist of a dough envelope enclosing a desired filling.

2. Prior Art

U.S. Pat. No. 4,362,497 issued Dec. 7, 1982 to Igor Lifshitz, describes food press forms, basically used for the same purpose as the present invention. U.S. Pat. No. 4,362,497 discloses a food press form having multiple molds with cutting edges and a separate pusher plug mold for ejection of the food products from the molds. Optional shapes of cutting units, insertable in the molds, are provided.

SUMMARY OF THE INVENTION

Food products are processed prior to consumption in a novel dual food press form, having two trays interconnected hingedly and rows of multiple separate preselected regular food product molding apertures, arranged staggered relative one another. Each molding aperture has typically a round, square, rectangular, hexagonal or the like configuration, internal tapering walls and is bottomless to facilitate easy removal of the food products; a top face of each molding aperture has a pasting area, and a cutting-edge knife terminus conforming to the edge of the molding aperture, projecting from the top surface of the trays.

The bottom surfaces of the trays are provided with rows of elongated members projecting therefrom, arranged staggered relative to one another, and function as supporting feet, when the hinged trays are placed in alignment with one another on a supporting surface, e.g., a table in preparation for processing the food products and as pushers, when the trays are folder invardly-in a flip-flap fashion—to eject the finished food products from the molding apertures.

The selected food product may typically consist of a first raw dough crust sheet laid over the multiple molding apertures on the trays and then pushed down into the molding apertures to conform with the internal volume of each molding aperture. In pressing down the dough the traces of the top configuration of each molding aperture will appear on the dough surface; a meat filling, for example, is then placed on and within each of the traced dough surfaces. A second raw dough crust sheet is thereafter placed over the first one.

The cook can then use his hands on a rolling pin to press and bond the two sheets of dough crust together and cutting them into the pattern of the selected cutting-edge knife termini, surrounding the top perimeter of each of the molding apertures. Any residual dough crust sheet may, if desirable be removed from areas adjacent to the molding apertures.

Included in the objects of the invention are:

To provide dual foldable trays for food products molding, for simultaneously making and cutting separately a great number of dough envelopes with various food fillings, usable domestically or in restaurants.

To provide the trays with feet which, when the trays are folded, will functions as pushing members to intercept and release the filled dough envelopes from the trays. Oher objects and advantages of the invention are taught in the following description and claims.

BRIEF DESCRIPTION OF THE DRAWINGS

FIG. 1 is a perspective front view of the food press form assembly with multiple molding apertures, according to the invention.

FIG. 1a is an enlarged perspective view of one of the molding apertures in FIG. 1.

FIG. 2 is a plan view of the food press form, seem from its bottom surface.

FIG. 3 is a sectional view through 3—3 of FIG. 1.

FIG. 4 is a perspective front view of another embodiment of the food press assembly in FIG. 1.

FIG. 4a is an enlarged perspective view of one of the molding apertures in FIG. 4.

FIG. 5 is a plan view of the food press form in FIG. 4, seen from its bottom surface.

FIG. 6 is a sectional view through 6—6 of FIG. 4.

DESCRIPTION OF THE INVENTION

In the drawings like reference characters designate similar parts in the several views of the drawings.

In FIG. 1, numerals 10 and 12 indicate, in a preferred embodiment, a dual foldable press form, consisting of two planar trays 16, having upper and bottom surface 26a, 26b, respectively and surrounding edge portions. The trays 16 are joined by hinging means, e.g. a loose-joint hinge comprising a male and a female portion, respectively 14 and 14a.

Each tray 16 is provided with a plurality of separate bottomless food product molding apertures 18, which have, typically a round, square, rectangular, triangular hexagonal or the like planar mold, configurating the round configuration 18a of same, being illustrated in FIG. 1. The tapered walls 20 of molds 18, as shown more clearly in FIG. 2, provide for easy removal of the finished food products from molds 18. The planar regular mold shapes, e.g., 18a provide close positioning of the molds 18 in trays 16, so that one attains maximal use of the dough sheets and filling applied to molds 18.

In order to maximally exploit the space on trays 16 (FIG. 1), there is provided a few semi-circularly shaped molds 18b.

Naturally, square or rectangular planar mold configurations provide a more efficient utilization of tray's 16 volume of molds 18. The top face 22 of each mold 18 has a pasting face 22a and a knife 24 with cutting edge terminus 24a thereon, configured around mold top face 22. (FIG. 1a).

Rows of the molds 18 are arranged on trays 16 in staggered relationships to one another, as seen in FIG. 1, from the top surface of trays 16.

The trays 16 are shown in FIG. 2 in unfolded position. Multiple feet 28 are provided, projecting integrally from the bottom surface 26b of trays 16. Each row of molds 18 is assigned a number of feet equal to that of the molds, being arranged in alignment with and between or next to the molds, respectively. With a view to another function of feet 28, they are so arranged relative to molds 18, that feet 28 of one row of molds will, when trays 16 are swung inwardly, i.e., bottom surface-to-bottom surface, apply themselves to the center portions of molds 18 of a corresponding row of the other tray, thus intercepting and ejecting finished food products from the molds 18.

The co-action between feet pushers 28 and molds 18 of folded trays 16 is clearly seen in FIG. 3, where the top and bottom surfaces of trays 16 are indicated by 26a, 26b, respectively.

The food product can typically have a first raw dough sheet laid over the unfolded trays 16 and the sheets pushed down into molds 18, nested in trays 16, conforming with the internal volume of molds 18. The first dough crust can then be filled with another mix of foods, as a filling, and covered with a second raw dough crust sheet. The preparer can then use his hands or a rolling pin to press the first and second crust together, bonding the two crusts and cutting them into the pattern of the cutting-edge 24a of knife 24 on molds 18, which are nested in tray 16.

As noted above, trays 16 are joined by hinge 14, 14a; and sections 17 of the hinge male portion project from the upper edge portions of trays 16 (FIG. 1). For quick and easy removal of the now cut food products, one simply takes manually hold of the projecting hinge portion 17, lifts up trays 16 from their unfolded position on the table, so that trays 16 will move inwardly toward one another, causing—in a flip-flop fashion—the feet-pushers 28 of one tray to intercept and eject the finished food product in the molds 18 of the other tray, onto the table.

Tray-16 are provided, at opposite sides with handle portions which combine to a handle 16c when trays 16 are folded to facilitate carrying of same.

In a second embodiment of the invention, as illustrated in FIGS. 4-6, the two press forms 34, 36 comprise trays 40, which are joined together by hinges 38, 38a, and molds 42, having tapered walls 44, top faces 46 and pasting faces 46a being nested in trays 40. Each mold is provided with a knife 48 with cutting edge terminus 48a, configured around the top face 46 of the mold.

The working principle underlying this embodiment is identical to that of the first embodiment, as described in detail above.

The basic differences between the two embodiments are that additional cutting means, in the form of a knife 50 with a cutting edge 50a is provided across the top face 46 of each mold 42; and pairs of feet 52 are mounted from the bottom surface of trays 40 between or adjacent each mold base 46b (FIGS. 5, 6).

All other components, their arrangements and purposes, as shown in FIGS. 1-5 remain intact with respect to the second embodiment of the invention. The practical consequences of accommodate an additional cross knife 50 and pairs of feet 52 are to enable one to cut and produce two, e.g., semi-circularly shaped food products from the dough crust from each mold.

When the trays 40 are swung inwardly or pair of feet will then enter the semi-circular spaces 42a, respectively, created in the mold, intercept and eject the food products from the mold 42.

Due to the mounting of dual feet for each mold, one would necessarily obtain fewer molds in the trays, but more food product units.

One, obviously is not limited to the choice of semi-circular molds, but any appropriate geometric shape could be utilized, such as squares, rectangulars, triangular, etc.

The press forms, 10, 12, 34, 36, according to the invetion, may be manufactured in any appropriate sizes and shapes. The molds 18, 42 may, typically range in size from 2-14 cm across and 2-4 cm. in depth. One may even dimension the molds to accommodate pies and the like. The materials of construction of the complete press forms can be steel, aluminum, copper and similar metals. Selected plastic compositions resistant to heat distortion at an oven temperature up to 700° F. can also be used.

The plastic composition can be colored. Plastic or metallic coatings known to easily release hot food can be applied to the metal form interiors.

Many modifications in the food press forms can be made in the light of my teachings. It is understood that within the scope of the claims, the invention can be practiced otherwise than described.

We claim:

1. A food processing device in combination, comprising:
   a. a first planar tray, having upper and bottom surfaces and surrounding edge portions;
   b. a second planar tray, having upper and bottom surfaces and surrounding edge portions each of said trays having a plurality of rows of separate food product molding apertures, arranged therein staggered relative to one another;
   c. hinging means mounted along and between facing edge portions of the trays, so that said trays, when joined, can swing from an aligned to a superposed position;
   d. a plurality of rows of multiple elongated feet members projecting integrally from the bottom surface of each tray, at least one of each of said feet members being positioned adjacent to and in alignment with one of said molding apertures, so that at least one of said feet members of one tray, being, respectively, sized and arranged to cooperate with and intrude into one of said molding apertures of the other tray, will, when the trays are being inwardly swung from an aligned into a superposed position, eject the molded food products therefrom.

2. A food processing device, as defined in claim 1, wherein each molding aperture has a shape appearing in plan view as a regular planar geometric figure, each molding aperture is bottomless, having tapered walls, each molding aperture having a top face and a knife cutting-edge terminus projecting from the upper surface of each tray and disposed around said top face in conformity with said shape.

3. A food processing device, as defined in claim 2, wherein each molding aperture is provided with a cutting edge knife terminus extending across the top face of the molding aperture for cutting the molded food products into halves, and a plurality of pairs of feet members are projecting integrally from the bottom surface of each tray, each pair of said feet members being, respectively, positioned adjacent to and in alignment with one of said molding apertures, and so arranged that one foot of each pair of feet members of one tray will, when the trays are superposed on one another, intrude into one half of the space of each molding apertures of the other tray, as divided by the crosswise extending knife, and eject that portion of the molded product therefrom.

4. A food processing device, as defined in claim 3, wherein the hinging means are loose joint hinges, including male and female portions, the male portion of which extending outside edge portions of the trays, to provide manual holding support, when swinging the trays from the aligned into the superposed position.

* * * * *